March 30, 1926.
G. W. GIBSON ET AL
1,578,423
INSECT DESTROYER
Filed Jan. 7, 1924
3 Sheets-Sheet 1
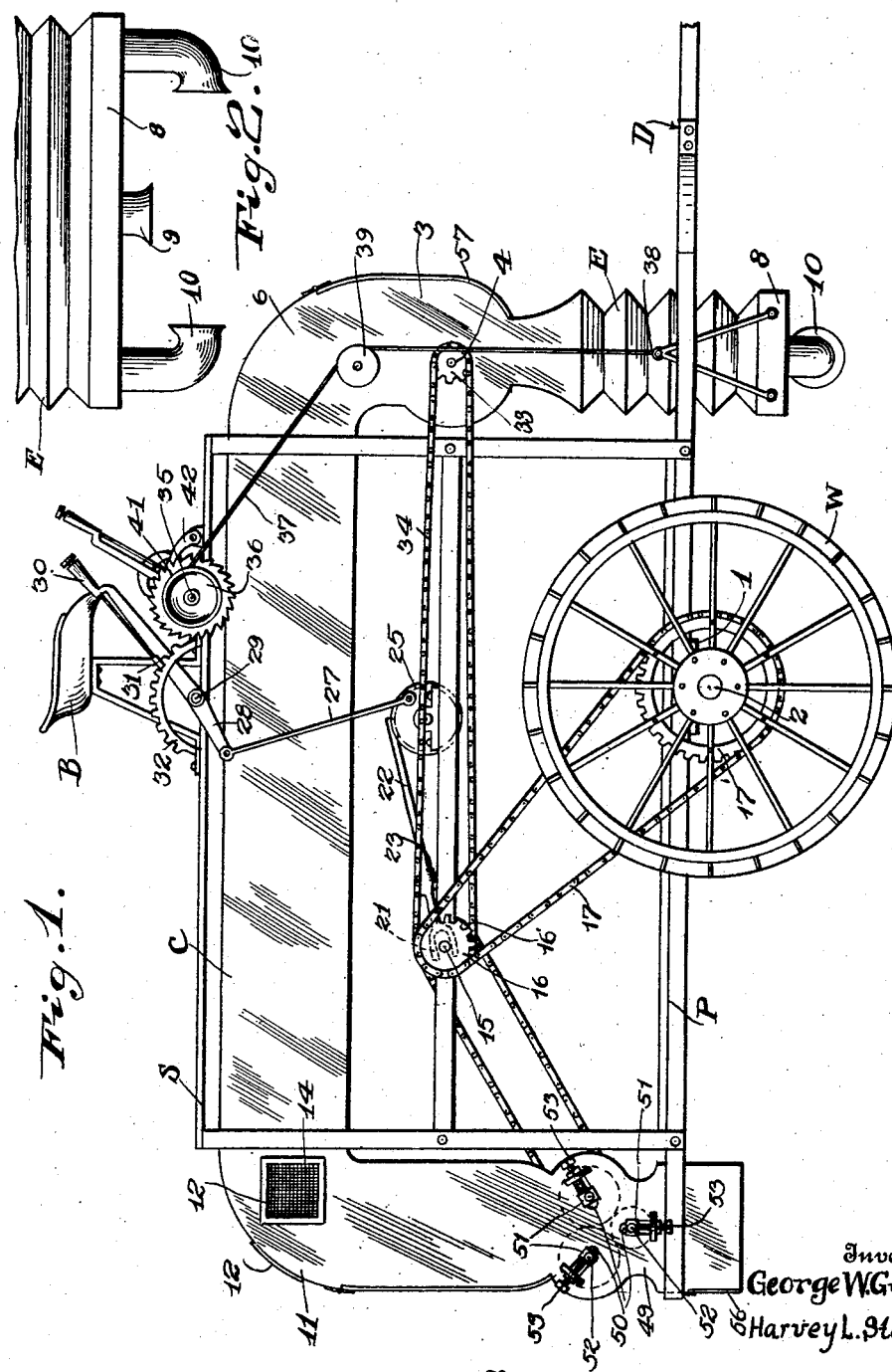

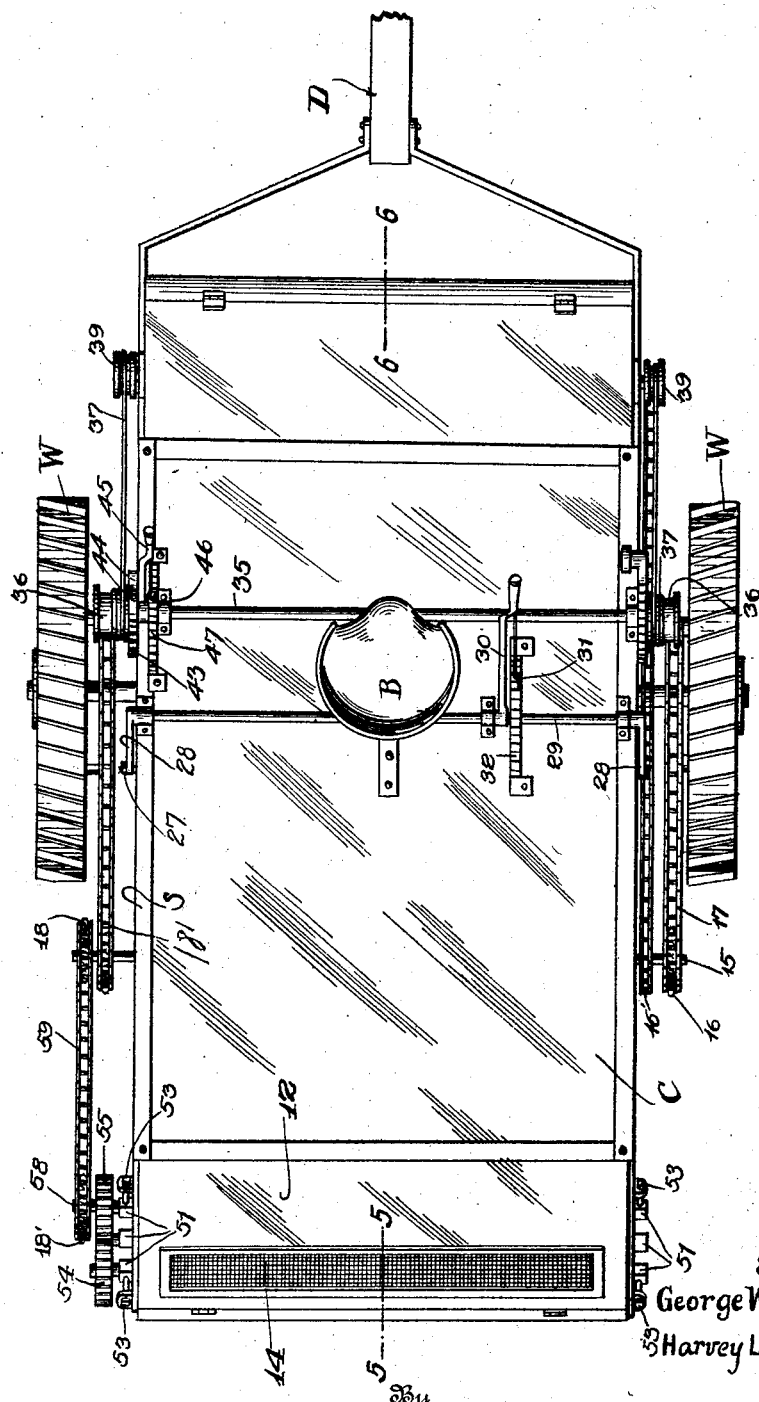

March 30, 1926. 1,578,423
G. W. GIBSON ET AL
INSECT DESTROYER
Filed Jan. 7, 1924 3 Sheets-Sheet 3
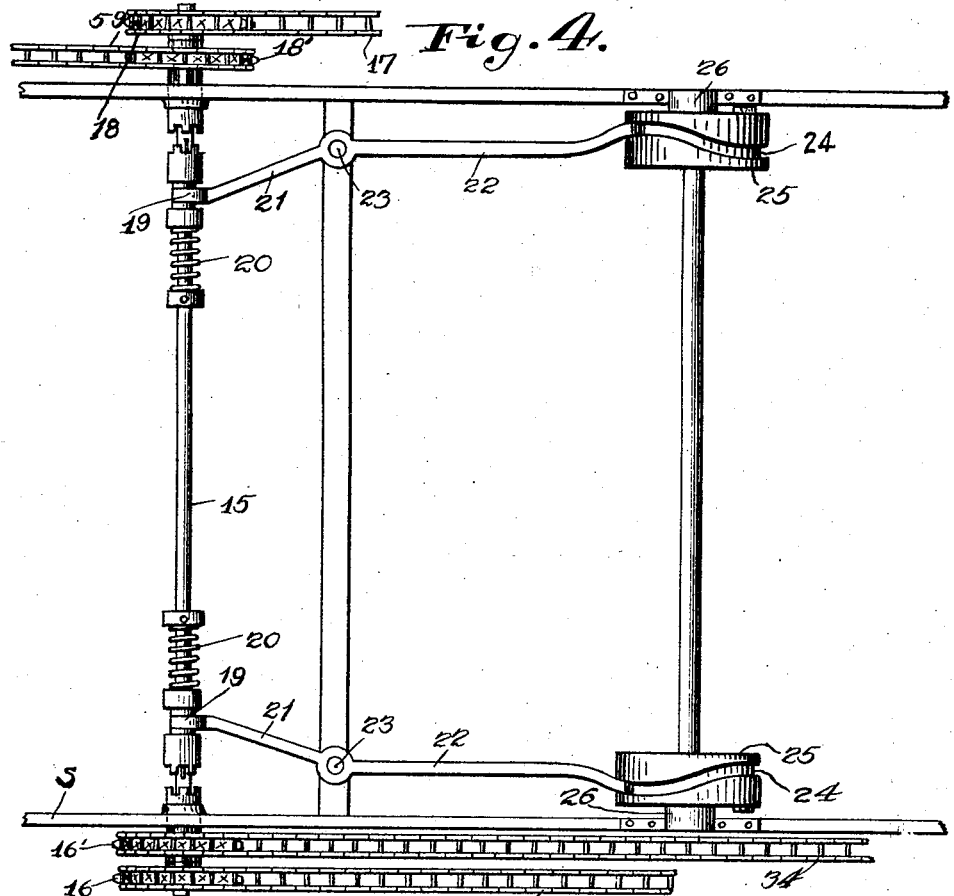
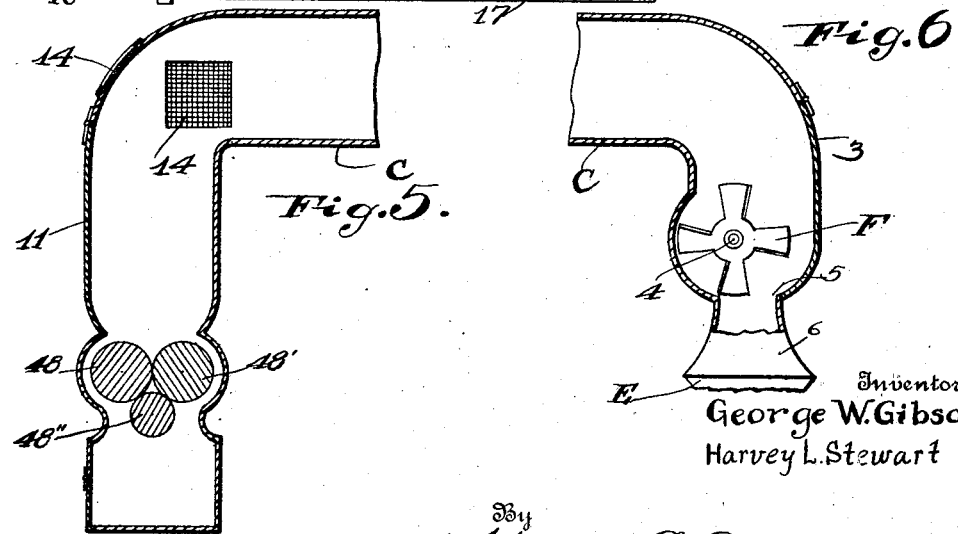
Inventor
George W. Gibson.
Harvey L. Stewart
By Watson E. Coleman, Attorney Patented Mar. 30, 1926.

1,578,423

UNITED STATES PATENT OFFICE.

GEORGE W. GIBSON AND HARVEY L. STEWART, OF HUMPHREY, ARKANSAS.

INSECT DESTROYER.

Application filed January 7, 1924. Serial No. 684,823.

*To all whom it may concern:*

Be it known that we, GEORGE W. GIBSON and HARVEY L. STEWART, citizens of the United States, residing at Humphrey, in the county of Arkansas and State of Arkansas, have invented certain new and useful Improvements in Insect Destroyers, of which the following is a specification, reference being had to the accompanying drawings.

This invention relates to insect destroyers and has relation more particularly to a device of this general character especially designed and adapted for use in the destruction of boll weevils and the like and it is an object of the invention to provide a device of this kind having novel and improved means whereby the boll weevils or other insects will be readily and conveniently collected without injury to the plants together with means for destroying the insects collected.

Another object of the invention is to provide a novel and improved device of this general character embodying two spaced hoppers one of which having gathering means associated therewith and delivering from the second hopper, the second hopper being provided with life destroying means.

Furthermore it is an object of the invention to provide a device of this general character embodying novel and improved means of a pneumatic character for collecting or gathering the boll weevils or the like to be destroyed, said means being so constructed and arranged to operate in conjunction with tops and sides of the plants.

Another object of the invention is to provide a novel and improved device of this general character comprising a suction head for gathering the insects to be destroyed together with means for supporting such head in a manner whereby the same may be vertically adjusted in accordance with the size of the plants or as may otherwise be required.

The invention consists in the details of construction and in the combination and arrangement of the several parts of our improved insect destroyer whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a view in side elevation of an insect destroyer constructed in accordance with an embodiment of our invention;

Figure 2 is a fragmentary view in front elevation of the head and nozzles carried thereby;

Figure 3 is a view in top plan of the structure as illustrated in Figure 1;

Figure 4 is an enlarged fragmentary view in plan illustrating in detail the clutch mechanism as herein included;

Figure 5 is a fragmentary sectional view taken substantially on the line 5—5 of Figure 3 through the rear housing and crushing members arranged therein;

Figure 6 is a sectional view taken substantially on the line 6—6 of Figure 3 through the front housing as herein disclosed.

As disclosed in the accompanying drawings, P denotes a platform of requisite dimensions and which is provided at a predetermined point intermediate its ends and at the opposite sides thereof with the underhung bearings 1. Operatively engaged with the bearings 1 and extending transversely of the platform is the axle 2 on the extremities of which are mounted the ground engaging wheels W.

Operatively engaged with the forward end portion of the platform P is a draft rigging D whereby the machine may be readily transported. In practice, the wheels W are adapted to be arranged at opposite sides of a row of plants to be treated with the platform P positioned thereabove.

Mounted upon the platform P and extending thereabove is a super-structure or supporting frame S which supports an elongated arched conduit C disposed in a direction lengthwise of the platform P.

The forward portion of the conduit C has in communication therewith and depending therefrom a casing 3 in which is arranged a fan F, said fan being fixed to a shaft 4 disposed through the casing and in a direction transverse of the platform P.

The induction opening 5 to the casing 3 is positioned at the lower portion of said casing 3 and is continued by a depending member or housing 6. The member or housing 6 has secured thereto and is continued by a depending expansible conduit E the walls of which being of a bellows construction and secured to the lower portion of said expansible conduit E is a head or plate 8 closing said lower end. The member E provides means whereby the head 8 may be raised or lowered as the occasions of practice may require.

Depending from the opposite end portions of the head or plate 8 and at the central portion thereof are the nozzles 9 and 10 in communication with the interior of the member E, the central nozzle 9 being straight and adapted to travel directly above the plant row while the end nozzles 10 are of an elbow type and with the lower or suction ends thereof disposed inwardly and adapted to be positioned at opposite sides of a plant row.

The fan F operates to create an upward suction through the member E whereby the boll weevils or other insects, lodged on the plants, are collected, said fan also creating a blast of air passing through the conduit C for gathering the insects to the opposite or rear end of said conduit and dropping such insects within the housing 11 depending from said rear end of the conduit. The side walls of the conduit C adjacent the rear wall thereof and the rear wall is provided with the openings 12, each of which having disposed thereover a reticulated fabric or screen 14, the air blast discharging through said openings 12.

Supported on the structure or frame S and extending transversely of the platform P is a line shaft 15 and fixedly mounted upon the extremities of said shaft are the sprockets 16 and 18, each of which being in driven connection through the medium of the chain 17 with a wheel W, said wheel having associated therewith a gear 17′ around which said chain passes.

Freely mounted on the opposite end portions of the shaft 15 are the sprockets 16′ and 18′. Associated with each pair of sprockets 16′ and 18′ are the clutching elements 19, said elements being maintained normally in working engagement through the instrumentality of the coil spring 20 surrounding the shaft 15.

Operatively engaged with the hub of each of the elements 19 is a fork 21 carried by an end portion of the horizontally disposed lever 22, said lever being supported intermediate its ends for swinging movement by an outstanding bracket 23 carried by the structure or frame S. The opposite or forward end portion of the lever 22 extends within a cam groove 24 formed in the periphery of a disc or wheel 25, said wheel being supported by an outstanding bracket 26 carried by the structure or frame S.

Operatively engaged with the disc or wheel 25 is a link 27 also operatively engaged with the crank arm 28 depending from a shaft 29. The shaft 29 is disposed transversely of the platform P adjacent the driver's seat B and is operatively supported by the supporting structure or frame S. An upstanding lever 30 is fixed to said shaft 29 whereby the occupant of the seat B may readily manipulate said lever to rotate the discs or wheels 25 in a direction whereby the sprockets 16 and 16′ may be disengaged from the sprockets 18 and 18′ or caused to engage therewith. The lever 30 carries a latch mechanism 31 of a conventional type coacting with an upstanding rack 32 also suitably supported by the structure or frame S.

The shaft 4 of the fan F extends to one side of the casing 3 and the extended portion of said shaft has fixed thereto a sprocket 33 around which passes a chain 34 which is also operatively engaged with the sprocket 18′ whereby the fan F is driven at desired speed from the line shaft 15 when the associated sprocket 16′ is clutched with said sprocket 18′.

Supported by the forward portion of the frame or structure S is a shaft 35 extending beyond opposite sides of said structure and to the outer end portions of this shaft are fixed the pulleys 36 upon which are adapted to be wound the flexible members 37. The flexible members 37 extend downwardly and are operatively engaged, as at 38, with the opposite end portions of the head or plate 8 whereupon said head may be raised or lowered as the requirements of practice may necessitate upon proper rotation of the shaft 35.

The flexible members 37 have coacting therewith the laterally disposed and outstanding guide pulleys 39 suitable supported by the member or housing 6. The shaft 35 also has fixed thereto a toothed wheel 41 with which engages the holding pawl 42 operatively supported by the structure or frame S whereby the head or plate 8 is maintained in desired raised position. It is to be understood that when this head 8 is to be raised or lowered, the pawl 42 is first disengaged from the wheel 41.

The shaft 35 also has fixed thereto a second toothed wheel 43 with which is adapted to be selectively engaged one of the reversely directed pawls 44 carried by the lever 45 freely engaged with the shaft 35. Upon oscillation or swinging movement of the lever 45 and with the requisite pawl 44 engaged with the toothed wheel 43, the shaft 35 may be rotated in a direction to raise or lower the plate or head 8.

The lever 45 is provided with a conventional latch mechanism 46 coacting with the upstanding rack 47 carried by the frame or structure S or otherwise as may be preferred.

The lever 45 is in relatively close proximity to the seat B so that the occupant thereof may readily grasp the same to raise or lower the plate or head 8 without leaving the seat.

Arranged within the housing 11 and disposed in a direction transversely of the platform P are the crushing rollers 48, 48' and 48" arranged in substantially a triangular formation in side elevation with two uppermost rollers substantially horizontally aligned.

Secured to the side walls of the housing 11 are the plates 49, each of said plates being provided with the radially disposed slots 50 three in number and equi-distantly spaced and in which are freely disposed the boxings 51 with which are engaged the shafts 52 of the crushing rollers 48, 48' and 48".

Engaged with each of the boxings 51 is a member 53 in threaded engagement with the plate 49. By proper manipulation of the screws 53 the rollers 48, 48' and 48" may be adjusted one with respect to the other as may best meet with the requirements of practice.

The shafts 52 of the rollers 48 and 48' are provided with the meshing gears 54 whereby said rollers are caused to rotate in unison and in a direction one toward the other. The shaft 52 of the third roller 48" is provided with a gear 55 meshing with one of the gears 54 whereby requisite rotation will be imparted to said roller 48".

As the boll weevils or other insects are received within the hopper 11, the same will be drawn between the rollers 48, 48' and 48" and crushed and dropped within the lower portion of the housing 11. The lower portion of the housing 11 is provided in a wall thereof with a door 56 to permit convenient access within said hopper 11 for the purposes of inspection or for removing the carcasses received within such hopper. The housing 6 hereinbefore referred to is also provided in a wall thereof with a door 57 to permit access therein for the purposes of inspection or as otherwise may be desired.

The shaft 52 of one of the rollers, as 48, has fixed thereto a sprocket 58 with which is operatively engaged a chain 59 also operatively engaged with the sprocket 18 carried by the line shaft 15 whereby the desired rotation of the rollers 48, 48' and 48" is effected.

While we have hereinbefore described the shaft 15 as being driven direct from the wheels W it will be understood that any other means may be employed for driving such shaft as an internal combustion engine or the like suitably mounted upon the platform P.

From the foregoing description it is thought to be obvious that an insect destroyer constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

An apparatus of the class described comprising, in combination, a portable structure, a conduit supported thereby and extending in the direction of travel of the structure, a casing depending from one end portion of the conduit and in communication therewith, an expansible member depending from and in communication with the casing, means within and supported by the casing for creating a suction through the expansible member and forcing a blast through the conduit, a shaft supported by the structure and disposed transversely of the conduit, drums on the shaft, means for rotating the shaft, a flexible member operatively engaged with each of the drums and with the lower portion of the expansible member, a guide pulley for each of the flexible members carried by a side wall of the conduit above the depending casing, and a nozzle carried by the lower portion of the expansible member and in communication therewith.

In testimony whereof we hereunto affix our signatures.

GEORGE W. GIBSON.
HARVEY L. STEWART.